United States Patent

[11] 3,576,188

| [72] | Inventor | Dale Richard Tanis |
| | | East Moline, Ill. |
| [21] | Appl. No. | 817,509 |
| [22] | Filed | Apr. 18, 1969 |
| [45] | Patented | Apr. 27, 1971 |
| [73] | Assignee | International Harvester Company |
| | | Chicago, Ill. |

[54] PIVOT DUMPING STONE TRAP
3 Claims, 3 Drawing Figs.

[52] U.S. Cl. .................................................. 130/27JT
[51] Int. Cl. .................................................. A01f 12/16
[50] Field of Search .................................................. 130/9, 9 (T)

[56] References Cited
UNITED STATES PATENTS
3,124,138   3/1964   Claas ............................ 130/9T Primary Examiner—Antonio F. Guida
Attorney—Noel G. Artman ABSTRACT: An apparatus for collecting and disposing of stones that are fed into a combine harvester. A trough-shaped trap is supported and secured in a collecting position and can be shifted to a dumping position at which the trough tends to empty itself and is accessible for inspection and service.

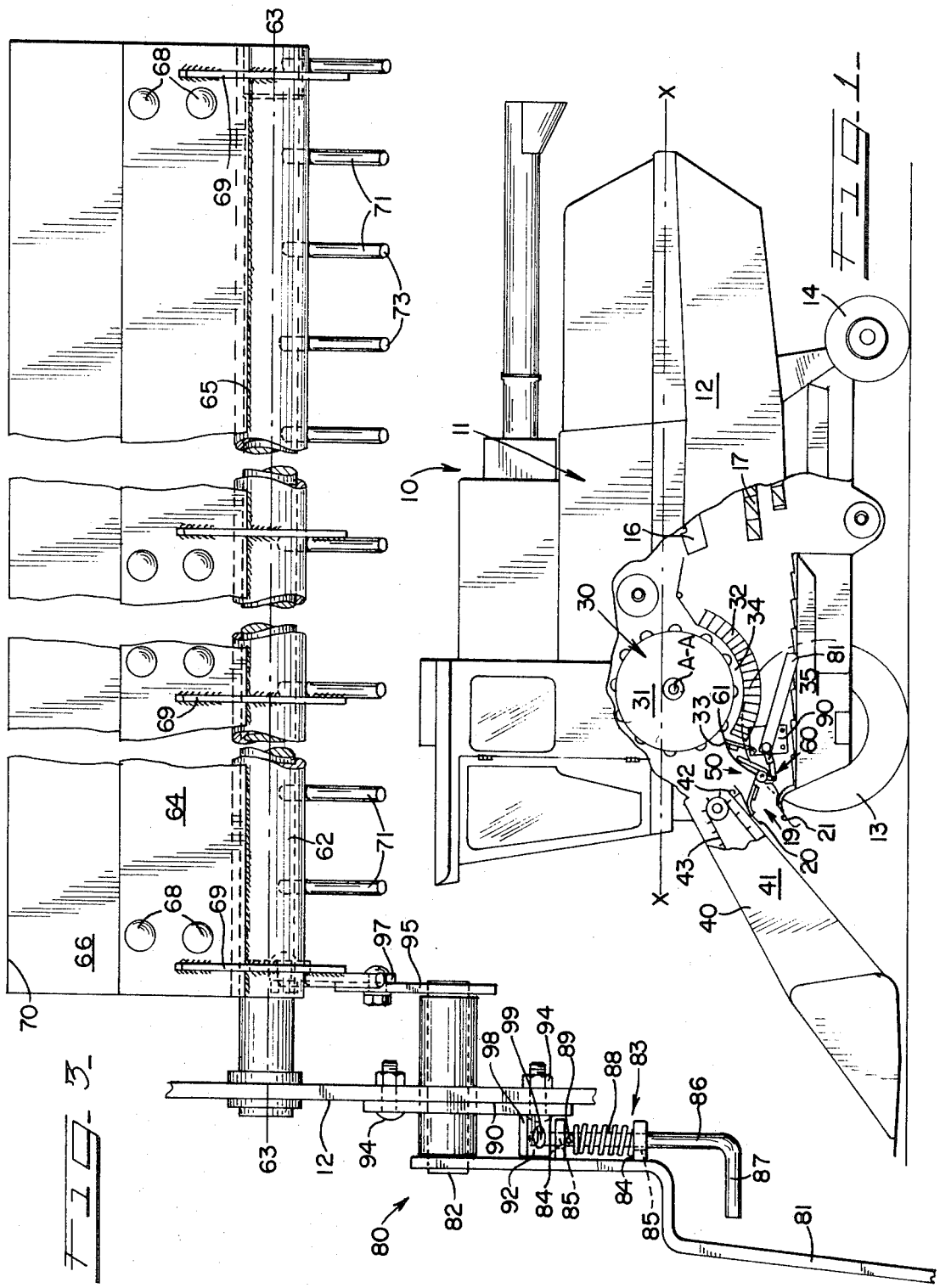

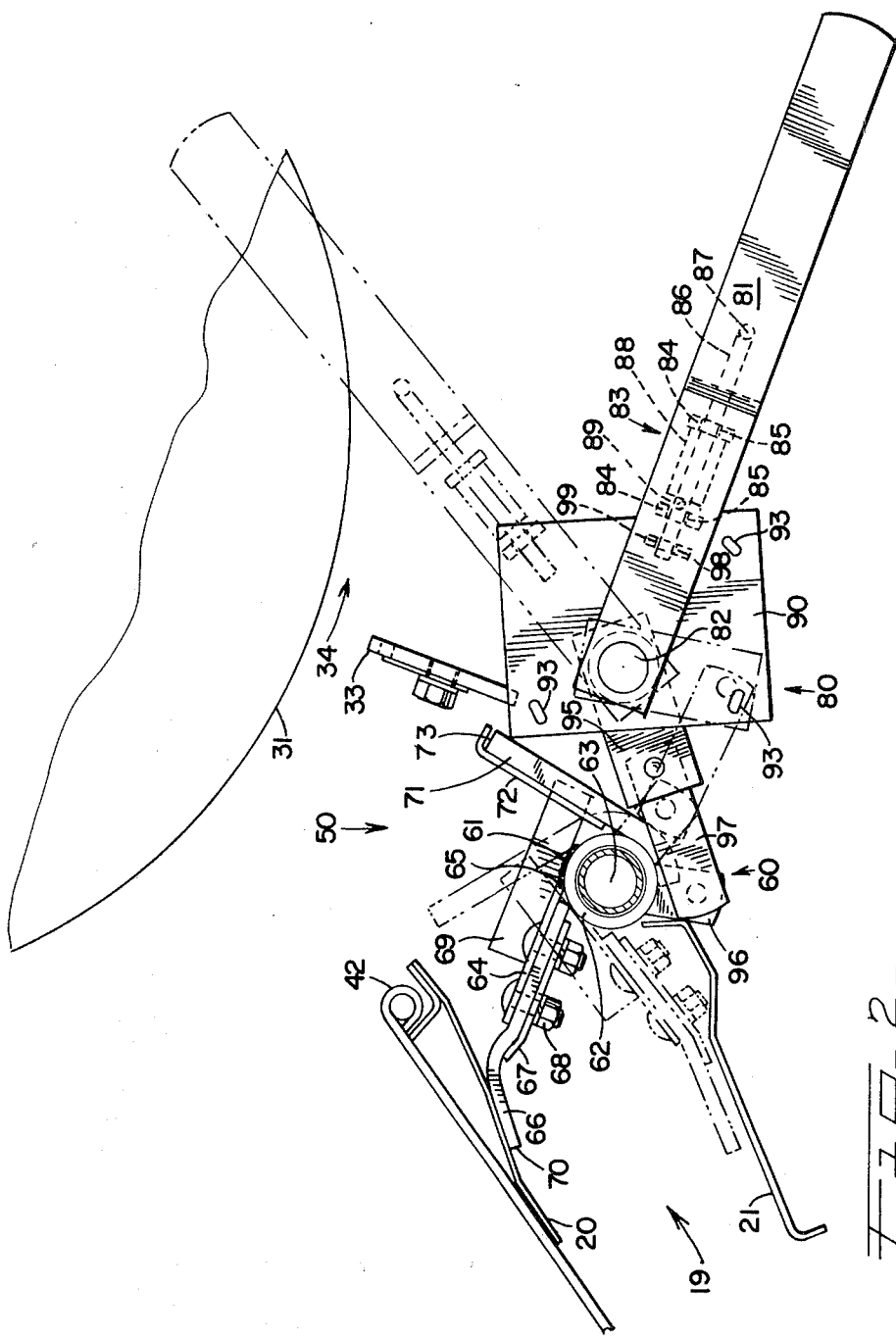

PIVOT DUMPING STONE TRAP

BACKGROUND OF THE INVENTION

1. Field of the Invention

The present invention relates generally to improvements in harvesting machines and the like and more particularly to a new and improved stone trap that will collect stones that have been fed into the machine before they reach the threshing, separating and cleaning components and enable the trapped stones to be easily removed from the machine.

2. Description of the Prior Art

There are various types of harvesting machine stone traps disclosed in the prior art. The patent to Collins et al. U.S. Pat. No. 3,209,759 of Oct. 5, 1965 discloses a trough-shaped trap, the front portion of which is formed as a pivoting door. When the door is opened material contained in the trap is free to fall by gravity from the trap. However, there is nothing to give the material a positive momentum to commence movement. It has been found that often the contents of the trap are tangled and compacted and requires some initial urging. Also on the Collins et al. device the operator must reach under the platform feeder to open the door. The patent to Krause U.S. Pat. No. 2,528,232 of Oct. 31, 1950 is representative of another prior-art type stone trap. In the Krause device a plate is held in the operative position relative to the threshing cylinder by spring-biased latches which will, in response to a predetermined abnormal pressure, release permitting the plate to fall away. The adjustment of traps such as this is very critical and the operator must be continuously alert to determine when the trap opens.

SUMMARY

The general purpose of this invention to provide a harvesting machine stone trap which embraces all the advantages of similarly employed stone traps and possesses none of the aforedescribed disadvantages. To attain this the present invention contemplates a unique trough-shaped stone trap that can be pivoted from the operative position to a dump position whereby positive momentum is imparted to the contents of the trap to thus empty the trap. A control handle is provided to allow the operator to pivot the stone trap from the side of the harvesting machine and to provide him with a leverage arm to facilitate this movement. It is an object of the present invention to provide a stone trap for a harvesting machine that is reliable and can be conveniently emptied from an accessible location.

BRIEF DESCRIPTION OF THE DRAWINGS

FIG. 1 is a side view of a harvesting machine having portions broken away to show the stone trap;

FIG. 2 is an isolated side view of the stone trap showing its operative position in full lines and its dumping position in broken lines; and FIG. 3 is an isolated plan view of the stone trap.

DESCRIPTION OF THE PREFERRED EMBODIMENTS

Referring now to the drawings wherein like reference characters designate like or corresponding parts throughout the several views there is shown in FIG. 1 a combine harvester 10 extending along a longitudinal axis designated X–X. The harvester 10 is made up of a body portion 11 having upright sidewalls 12 and is supported by drive wheels 13 and steerable wheels 14. The body portion 11 encloses the grain-threshing mechanism 30, the separating mechanism 16 and the cleaning mechanism 17.

The grain-threshing mechanism 30 includes a threshing drum 31 mounted for rotation about a transverse axis A–A. A concave 32 having a leading edge 33 is mounted below the threshing drum 31 and defines a threshing zone 34 therebetween. A grain pan 35 is located below the concave 32 and functions to collect the grain passing through the concave and conveys it rearwardly towards the cleaning mechanism 17. Material such as straw that does not pass through the concave 32 is discharged by the threshing drum 31 to the separating mechanism 16 which functions to separate out any remaining grain which then falls to the cleaning mechanism 17 and discharges the remaining straw to the ground through the rear of the harvester 10.

Unthreshed material is collected and fed into the harvester 10 by the platform or crop supply means 40. The collected material is fed upwardly and rearwardly through the feeder portion 41 which contains a conveyor 43 therein. The feeder portion 41 has a discharge edge 42 over which the conveyor 43 discharges the unthreshed material in a direction toward the threshing zone 34.

As can be seen in FIGS. 1 and 2 there is a stone-catching gap 50 between the discharge edge 42 of the feeder portion 41 and the leading edge 33 of the concave 32. The unthreshed material is in the form of a cohesive sheet that has sufficient momentum to cause it to bridge the stone-catching gap 50. If the unthreshed material contains any foreign objects having a high mass such as stones or pieces of metal they will fall by gravity through the stone-catching gap 50 and thus will not enter the threshing zone 34.

A stone-collecting and -dumping trap 60 is located below the stone-catching gap 50 for the purpose of catching and disposing of any material that falls through the stone-catching gap. The stone-collecting and -dumping trap 60 includes a transversely extending trough-shaped stone trap designated 61 that extends across the entire width of the stone-catching gap 50. The trough-shaped stone trap 61 includes a pivot shaft 62 mounted along a transverse pivot axis 63. An elongated plate 64 is secured as by welding 65 to the pivot shaft 62. An elongated elastomer sheet 66 is sandwiched between the elongated plate 64 and a backing plate 67 and is secured thereto by fastening means such as nuts and bolts 68. A plurality of longitudinally extending baffles or supports 69 are secured to the pivot shaft 62 and the upper surface of the elongated plate 64 and function to add rigidity to the connection and also to separate the upper surface of the plate 64 into sections along its transverse width. The trough-shaped stone trap 61 thus has a transverse front edge designated 70 formed of the elastomer sheet 66. A plurality of bars 71 are secured to the pivot shaft 62 and extend upwardly and rearwardly therefrom. As can be best seen in FIG. 3 the bars 71 all terminate at a point an equal distance from the pivot shaft 62 to thus form a transverse rear edge 73. The plurality of bars 71 form a sort of grille through which small material can pass. As can be seen in FIG. 1 any material such as grain that falls into the trough-shaped stone trap 61 will pass through the bars 71 and be collected by the grain pan 35. For some crops such as corn it is undesirable to permit chunks of cob of a size that could pass between the bars 71 to be collected on the grain pan 35 and to prevent this a cover sheet 72 (see FIG. 2) can be fastened to the bars 71. As is seen in FIG. 2 the transverse rear edge 73 is located adjacent to the leading edge 33 of the concave 32.

As is seen in FIGS. 1 and 2 there is a trash disposal opening 19 formed in the front end of the harvester 10. This opening has a roof 20 and a downwardly and forwardly inclined bottom 21. It should be noted that when the trough-shaped stone trap 61 is in the operative position the elastomer sheet 66 bears against the roof 20 to form a seal therewith and that when the trough-shaped stone trap 61 is in the dumping position the elastomer sheet 66 substantially overlaps the bottom 21.

As can be best seen in FIG. 2 the elongated plate 64 is secured to the pivot shaft 62 along a line substantially parallel to and above the transverse pivot axis 63. The bars 71 are secured to the pivot shaft 62 along a line substantially diametrically opposite and thus below the transverse pivot axis 63. By this construction it is seen that the lowest point or nadir 74 of the trough-shaped stone trap 61 lies along a line rearwardly of the transverse pivot axis 63. Material collected in the trough-shaped stone trap 61 would tend to gravitate toward the nadir 74 and when the stone trap is pivoted about the transverse pivot axis 63 the material contained therein will move in an arcuate path. When pivotable movement of the trough-shaped stone trap 61 is stopped the material will attempt to continue moving in its forward direction and there is thus a tendency for the material to be separated from the trough-shaped stone trap. The magnitude of the separating force is a function of the mass of the material carried by the stone trap and the velocity at which this material was moving before the stone trap is brought to an abrupt stop.

Control means 80 including an elongated handle 81 is provided for imparting the pivotable movement to the trough-shaped stone trap 61. The leverage provided by the handle 81 increases the velocity at which the trough-shaped stone trap 61 can be pivoted and thereby increases the separating force imparted to the material carried by the stone trap 61. The handle 81 has a handle pivot shaft 82 secured to one end thereof and this shaft is carried by mounting means supported by the upright sidewall 12 of the harvester. The mounting means include a mounting plate 90 having a plurality of elongated slots 93 formed therein. Corresponding round apertures are also formed in the sidewall 12 and nuts and bolts 94 pass through the apertures formed in both the mounting plate 90 and the upright sidewall 12. The elongated slots 93 are formed along arcs generated about the pivotable axis of the handle 81. Thus the attitude of the mounting plate 90 can be pivotally adjusted about the pivot axis of handle 81 within the range permitted by the slots 93. The handle 81 carries a locking component 83 that can cooperate with a complementary locking component 92 carried by the mounting plate 90 to thus lock the handle 81 to relative to the mounting plate 90. The locking component 83 carried by the handle includes a pair of tabs 84 having aligned apertures 85 formed therein. A rod 86 having an offset portion 87 extends through the apertures 85 formed in the tabs 84. A coil spring 88 surrounds a portion of rod 86 between the tabs 84. One end of spring 88 bears against a pin 89 extending through the rod 86 and the other end of the spring bears against one of the tabs 84 to thus bias the rod 86 toward the position where the pin 89 bears against the other of the tabs 84. The locking components 92 carried by the mounting plate 90 is made up of a tab 98 having an aperture 99 formed therein. The tab 98 is arranged such that the handle 81 can assume a position with respect to the mounting plate that will permit the rod 86 to extend through the aperture 99 to thus lock the handle 81 relative to the mounting plate 90. When it is desired to move the handle 81 it can be unlocked by grasping the offset portion 87 and pulling the rod 86 against the action of the spring 88.

Linkage means connect the handle pivot shaft 82 to the pivot shaft 62 of the trough-shaped stone trap to thus transfer the pivotable movement of the handle 82 to the stone trap 61. These linkage means include a first lever arm 95 secured to the pivot shaft 82, a second lever arm 96 secured to the pivot shaft 62 and a link 97 connecting the first lever 95 to the second lever arm 96.

OPERATION

Upon setting up the combine or in subsequent adjustments the mounting plate 90 can be pivoted within the limits of the slots 93 to thus provide a good seal between the elastomer sheet 66 and the roof 20 of the trash disposal opening 19 and also to take up any slack in the linkage connecting to the handle 82 to the trough-shaped stone trap 61.

When the operator desires to empty the trough-shaped stone trap 61 he would do so from the side of the combine by pulling back on the offset portion 87 of the rod 86 thus releasing the handle 81 and then pivoting the handle from the full line position as shown in FIG. 2 to the broken line position. The linkage connecting the handle 81 and the trough-shaped stone trap 61 is such that the stone trap will be brought to a sudden stop when the handle reaches the position shown in broken lines in FIG. 2. Thus a considerable force can be imparted to the material causing it to continue its movement through the trash disposal opening 19 when the trough-shaped stone trap 61 is suddenly stopped. Through this mechanism the operator can empty the stone trap from the side of the machine even though the material contained therein is tangled and would not freely slide from the tipped stone trap. This is considered to be an important advantage of applicant's invention since the trash disposal opening 19 is not easily acceptable to the operator. For the purpose of simplicity in FIG. 1 the hydraulic cylinders for raising and lowering the platform 40 and the drives for the various driven elements of the platform have not been shown but in an actual machine these components make it difficult for an operator to crawl under the platform 40 to manually reach through the trash disposal opening 19 to remove material from the stone trap 61.

I claim:

1. A harvester having a generally longitudinally extending axis and adapted to travel in a direction along its longitudinal axis, said harvester having a body portion including upright sidewalls;

a grain-threshing mechanism comprising:

a threshing drum mounted for rotation about a transverse axis, a concave having a leading edge substantially parallel to said transverse axis and mounted in cooperative relationship to said threshing drum defining a threshing zone therebetween;

crop supply means located forwardly of said threshing zone for advancing unthreshed crop rearwardly toward said threshing zone, said crop supply means having a discharge edge that is substantially parallel to said transverse axis and spaced from said leading edge forming a stone-catching gap therebetween;

a stone-collecting and -dumping trap comprising:

a transversely extending trough-shaped stone trap having a transverse front and a transverse rear edge, said trough-shaped stone trap includes a pivot shaft journaled on said sidewalls about a transverse pivot axis to thus mount the trough-shaped stone trap for movement between a collecting position and a dumping position, said transverse pivot axis located adjacent the nadir of said trough-shaped stone trap, said trap is when in the collecting position located below and in receiving relationship to said stone-catching gap with said front transverse edge adjacent said discharge edge and said rear transverse edge adjacent said leading edge, the forward portion of said trough-shaped stone trap extending rearwardly from the transverse front edge towards the transverse pivot axis is made of material impervious to the passage of grain and wherein the rearward portion of trough-shaped stone trap extending forwardly from the transverse rear edge towards the transverse pivot axis is constructed such that it will permit the passage of grain therethrough;

control means for fixing said trough-shaped stone trap in the collecting position and for pivoting it from the collecting position such that the front transverse edge moves downwardly and away from said discharge edge and said rear transverse edge moves upwardly and away from said leading edge.

2. The invention as set forth in claim 1 wherein said control means includes an elongated handle journaled for pivotable movement on the outer surface of one of said upright sidewalls by mounting means, linkage means connecting said handle to said pivot shaft and operative to transmit pivotable movement of said handle to said trough-shaped stone trap.

3. A harvester having a generally longitudinally extending axis and adapted to travel in a direction along its longitudinal axis, said harvester having a body portion including upright sidewalls;

a grain-threshing mechanism comprising:

a threshing drum mounted for rotation about a transverse axis, a concave having a leading edge substantially parallel to said transverse axis and mounted in cooperative relationship to said threshing drum defining a threshing zone therebetween;

crop supply means located forwardly of said threshing zone for advancing unthreshed crop rearwardly toward said threshing zone, said crop supply means having a discharge edge that is substantially parallel to said transverse axis and spaced from said leading edge forming a stone-catching gap therebetween;

a stone-collecting and -dumping trap comprising:

a transversely extending trough-shaped stone trap having a transverse front and a transverse rear edge, said trough-shaped stone trap including a pivot shaft journaled on said sidewalls about a transverse pivot axis to thus mount the trough-shaped stone trap for movement between a collecting position and a dumping position, said transverse pivot axis located adjacent the nadir of said trough-shaped stone trap, said trap is when in the collecting position located below and in receiving relationship to said stone-catching gap with said front transverse edge adjacent said discharge edge and said rear transverse edge adjacent said leading edge;

control means for fixing said trough-shaped stone trap in the collecting position and for pivoting it from the collecting position such that the front transverse edge moves rearwardly downwardly and away from said discharge edge and said rear transverse edge moves upwardly and away from said leading edge, said control means including an elongated handle journaled for pivotable movement on the outer surface of one of said upright sidewalls by mounting means, linkage means connecting said handle to said pivot shaft and operative to transmit pivotable movement of said handle to said trough-shaped stone trap; and wherein said mounting means includes a mounting plate, a tube fixed to said mounting plate such that its axis is substantially normal to said mounting plate, said mounting plate being fixedly secured to said one sidewall by means that will permit it position relative to said sidewall to be adjusted about said tube as the center, a locking component on said mounting plate, said handle having a handle pivot shaft secured thereto and dimensioned to be journaled in said tube, said handle further having a locking component thereon adopted to cooperate with the locking components on said mounting plate to lock the handle in the collecting position.